(12) United States Patent
Whitton

(10) Patent No.: US 7,225,446 B2
(45) Date of Patent: May 29, 2007

(54) CONTEXT PRESERVATION

(75) Inventor: Robert Allan Whitton, Ashford (GB)

(73) Assignee: PTS Corporation, San Jose, CA (US)

(*) Notice: Subject to any disclaimer, the term of this patent is extended or adjusted under 35 U.S.C. 154(b) by 790 days.

(21) Appl. No.: 10/073,442

(22) Filed: Feb. 11, 2002

(65) Prior Publication Data

US 2002/0116436 A1    Aug. 22, 2002

Related U.S. Application Data

(60) Provisional application No. 60/291,512, filed on May 16, 2001.

(30) Foreign Application Priority Data

Feb. 20, 2001    (GB)    ................................ 0104165.6

(51) Int. Cl.
    *G06F 9/46* (2006.01)
(52) U.S. Cl. ........................ 718/108; 718/100
(58) Field of Classification Search ......... 718/100–108
    See application file for complete search history.

(56) References Cited

U.S. PATENT DOCUMENTS

| | | | | |
|---|---|---|---|---|
| 5,127,098 A | * | 6/1992 | Rosenthal et al. | ........... 711/202 |
| 5,481,719 A | * | 1/1996 | Ackerman et al. | ........... 718/108 |
| 5,812,823 A | | 9/1998 | Kahle et al. | ................. 395/500 |
| 6,047,122 A | * | 4/2000 | Spiller | ........................ 718/108 |
| 6,052,708 A | * | 4/2000 | Flynn et al. | ................. 718/108 |
| 6,065,114 A | * | 5/2000 | Zahir et al. | ................... 712/228 |
| 7,051,330 B1 | * | 5/2006 | Kaler et al. | .................. 718/106 |

FOREIGN PATENT DOCUMENTS

| | | |
|---|---|---|
| EP | 0 197 552 | 10/1986 |
| EP | 0 747 808 | 12/1996 |
| EP | 0 962 856 | 8/1999 |

OTHER PUBLICATIONS

Silberschatz, Abraham, and Galvin, Peter Baer, Operating System Concepts, 1999, John Wiley & Sons, Inc, 5th Edition, p. 97.*

* cited by examiner

*Primary Examiner*—Meng-Al T. An
*Assistant Examiner*—Kenneth Tang
(74) *Attorney, Agent, or Firm*—Greer, Burns & Crain, Ltd.

(57) ABSTRACT

A processor which is switchable between a first execution mode (such as a scalar mode) and a second execution mode (such as a VLIW mode) is disclosed. The processor has a first processor context when in the first execution mode and a second processor context, different from the first processor context, when in the second execution mode. The processor generates an exception when the processor attempts to change from one execution mode to the other. When the processor switches to a thread of execution which is in the first execution mode, or when the processor switches to a thread of execution which was the last thread to be in the second execution mode, only the first processor context is preserved. The processor may be arranged such that the number of threads that may be in the second execution mode at any one time is less than the total number of threads that may be active on the processor at any one time.

16 Claims, 10 Drawing Sheets

A. Run thread A    1. Stop running A    PA. Preserve context of A
B. Run thread B    2. Start running B    RB. Restore context of B
                     3. Stop running B    PB. Preserve context of B
                     4. Start running A    RA. Restore context of A

CONTEXT PRESERVATION

This application claims the benefit of U.S. Provisional Application Ser. No. 60/291,512, filed May 16, 2001, under 35 U.S.C. § 119(e).

BACKGROUND OF THE INVENTION

The present invention relates to processors, and in particular to processors which are switchable between two or more different execution modes, for example scalar mode and very-long-instruction-word (VLIW) mode.

In order to meet the needs of different processing tasks, it has been proposed to provide processors which are switchable between two or more different execution modes. The two or more execution modes may have different instruction sets, which may be designed with different types of processing task in mind. For example, one instruction set may be designed for sequential execution as in a conventional processor, whereas another instruction set may be designed to allow a number of instructions to be executed in parallel. Thus, the processor typically has a first execution mode in which at least a first instruction set is supported, and a second execution mode in which at least a second instruction set is supported. The processor typically transfers from one execution mode to another by executing a special instruction or group of instructions.

Modern processors are usually designed to support multi-tasking, that is, they allow several threads of execution to be processed at what appears to the user to be the same time. This is usually achieved by switching the processor's resources rapidly between various threads under operating system control to give the illusion of simultaneous processing of the threads. Such a switch is referred to herein as a context switch. Whenever a context switch takes place, the contents of the processor's registers, flags etc. (referred to as the processor context) must be returned to that when the new thread was last executed. This is done by preserving the current processor context, by saving it in memory, and restoring the processor context for the new thread, by retrieving it from memory. In known processors, when a context switch takes place, the entire processor context is preserved and restored, since the operating system does not know which part of the processor context was used by the outgoing thread and which part will be used by the incoming thread.

In processors which are switchable between two or more different execution modes, the size of the processor context in the various modes may be different. This may result in parts of the processor context being preserved and restored unnecessarily when a context switch takes place.

For example, in processors which are able to support parallel processing, the processor context may be large, and hence a large amount of data may need to be preserved and restored on each context switch. Even if the processor did not always operate in a parallel processing mode, the processor context of the parallel processing mode would nonetheless be preserved and restored on each context switch. This may consume an undesirably large amount of processor time, and thereby reduce the rate at which tasks can be processed.

SUMMARY OF THE INVENTION

The present invention seeks to overcome the above problems.

According to a first aspect of the present invention there is provided a processor switchable between a first execution mode and a second execution mode, the processor having a first processor context when in the first execution mode and a second processor context, different from the first processor context, when in the second execution mode, wherein the processor is arranged to generate an exception when the processor attempts to change from one execution mode to the other.

By generating an exception when the processor attempts to change from one execution mode to the other, the processor's operating system can keep track of when the various execution modes are being used. This can allow the operating system to control which parts of the processor context (comprising the contents of storage locations in the processor) are preserved at which times. The exception may be generated when the processor attempts to change from the first execution mode to the second, or when the processor attempts to change from the second execution mode to the first, or an exception may be generated in both cases.

For example, the second processor context may be larger than the first processor context and the exception may be generated when the processor attempts to change from the first execution mode to the second execution mode. This may allow the second processor context to be preserved only when absolutely necessary, which may improve the overall system performance.

In the above case, the processor may be arranged to preserve the second processor context, or that part of the second processor context which is different from the first processor context, when such an exception has been generated. This may avoid the need to save the second processor context on every context switch. Depending on the implementation, the second processor context may either be preserved automatically when such an exception is generated, or it may be determined whether or not it is necessary to preserve the second processor context at that stage. For example, if the current thread is also the last thread to have been in the second execution mode, then it may not be necessary to preserve the second processor context.

In certain circumstances, for example where two or more threads are both in the second execution mode, it may be necessary to preserve the second processor context when a context switch occurs. For example, if the processor is subsequently switched to a thread which is in the second execution mode and which is not the last thread to be in the second execution mode, then it may be necessary to preserve the second processor context at that stage. Thus the processor may be arranged to execute a plurality of threads on a time share basis, and the processor may be arranged such that, when the processor is switched to a thread which is in the first execution mode, or when the processor is switched to a thread which was the last thread to be in the second execution mode, only the first processor context is preserved. The processor may then be arranged such that the second processor context, or that part of the second processor context which is different from the first processor context, is preserved when the processor next enters the second execution mode to execute a thread other than the last thread to be in the second execution mode.

In order to limit the number of times that the second processor context is preserved and restored, the number of threads that may be in the second execution mode may be limited. Thus the processor may be arranged to execute a plurality of threads on a time share basis, and the number of threads that may be in the second execution mode at any one time may be less than the total number of threads that may be active on the processor at any one time. This may improve the overall system performance.

In order to implement the above technique, the processor may be arranged such that, when the exception has been generated, a check is carried out to determine whether the thread that caused the exception is allowed to enter the second execution mode. For example, only certain predetermined threads may be allowed to execute in the second execution mode, and thus the check may comprise determining whether the thread that caused the exception is barred from the second execution mode.

In another example, the processor's operating system only allows a limited number of threads to be in the second execution mode at any one time. Thus the check may comprise determining whether a predetermined number of other threads are already in the second execution mode. The predetermined number may be greater than or equal to one. If more than the predetermined number of threads are already in the second execution mode, the processor may be arranged to prevent the thread that caused the exception from entering the second execution mode, for example, by terminating the thread, or by continuing execution of the thread in the first execution mode, or by suspending execution of the thread until fewer than the predetermined number of other threads are in the second execution mode.

Thus the processor may be arranged such that, if a predetermined number of other threads are already in the second execution mode, execution of the thread that caused the exception is suspended until the number of other threads that are in the second execution mode is less than the predetermined number. An exception may be generated when a thread attempts to change from the second execution mode to the first execution mode, so that it is known (for example, by the operating system) when a thread has stopped executing in the second execution mode.

Preferably the processor is arranged to execute a first instruction set when in the first execution mode and a second instruction set when in the second execution mode. The second instruction set may be able to access a greater number of storage locations (such as registers) in the processor than the first instruction set.

Preferably the processor is switchable between a supervisor mode and a user mode, the user mode having restricted access to the processor's resources in comparison to the supervisor mode, and, when said exception is generated, the processor transfers from the user mode to the supervisor mode. An exception handling program portion may then be provided which executes in the supervisor mode to deal with the exception. The exception handling program portion may be a part of the operating system.

The processor may comprise at least one execution unit and a plurality of storage locations, and the first processor context may comprise the contents of storage locations accessible in the first execution mode and the second processor context may comprise the contents of storage locations accessible in the second mode of execution. There may be an intersection between the two processor contexts; for example the second processor context may include some or all of the first processor context.

The processor may comprise a plurality of computational units for executing instructions in parallel, each computational unit having at least one execution unit and at least one storage location to which the execution unit has access. In the first execution mode a first number of computational units may execute instructions, and in the second execution mode a second number of computational units may execute instructions. The first and second numbers may be different from each other; for example the first number may be at least one and the second number may be greater than the first number. Alternatively, the first and second numbers may the be same, and the number of storage locations which are accessible in the first execution mode may be different from the number of storage locations which are accessible in the second execution mode.

In one example the first execution mode is a scalar mode and the second execution mode is a parallel mode, such as a VLIW mode. In another example, the first and second execution modes are both scalar modes, or both parallel modes, and a different number of the processor's storage locations are accessible in the two modes. The two execution modes may have intersecting functionality; for example the instruction set of one execution mode may include some or all of the instructions of the instruction set of the other execution mode.

An important aspect of the present invention is that the larger of the two processor contexts is not necessarily preserved on every context switch. For example, if the second processor context is larger than the first, then it is generally only necessary to preserve the second processor context (or that part of the second processor context which is different from the first processor context) on a context switch if the new thread is in the second execution mode and was not the last thread to be in the second execution mode. Otherwise only the first processor context need be preserved. Thus, according to a second aspect of the invention there is provided a processor switchable between a first execution mode and a second execution mode, the processor having a first processor context when in the first execution mode and a second processor context, larger than the first processor context, when in the second execution mode, wherein the processor is arranged to execute a plurality of threads on a time share basis, and the processor is arranged such that, when the processor switches to a thread which is in the first execution mode, or when the processor switches to a thread which was the last thread to be in the second execution mode, only the first processor context is preserved.

Preferably the second processor context, or that part of the second processor context which is different from the first processor context, is preserved when the processor next enters the second execution mode to execute another thread. The processor may be arranged such that the number of threads that may be in the second execution mode at any one time is less than the total number of threads that may be active on the processor at any one time. The first execution mode may be a scalar mode and the second execution mode may be a parallel mode, such as a VLIW mode.

Another important aspect of the present invention is that the number of threads which, at any one time, may be in the execution mode having the largest context is limited, in order to limit the number of times that that processor context must be preserved and restored. Thus, according to a third aspect of the invention there is provided a processor switchable between a first execution mode and a second execution mode, the processor having a first processor context when in the first execution mode and a second processor context, larger than the first processor context, when in the second execution mode, wherein the processor is arranged to execute a plurality of threads on a time share basis, and the processor is arranged such that the number of threads that may be in the second execution mode at any one time is less than the total number of threads that may be active on the processor at any one time.

The processor may be arranged such that, when a thread attempts to enter the second execution mode, a check is carried out to determine whether that thread is allowed to enter the second execution mode. For example, the check may comprise determining whether that thread is a thread which is barred from the second execution mode, or the check may comprise determining whether a predetermined number of other threads are already in the second execution mode. In the latter case the processor may be arranged such that, if a predetermined number of other threads are already in the second execution mode, the thread that attempted to enter the second execution mode is prevented from entering the second execution mode until the number of other threads that are in the second execution mode is less than the predetermined number. For example, execution of the thread that attempted to enter the second execution mode may be suspended until the number of other threads that are in the second execution mode is less than the predetermined number.

Corresponding method aspects of the invention are also provided, and thus according to a fourth aspect of the invention there is provided a method of operating a processor, the processor being switchable between a first execution mode and a second execution mode and having a first processor context when in the first execution mode and a second processor context, different from the first processor context, when in the second execution mode, the method comprising generating an exception when the processor attempts to change from one execution mode to the other.

According to a fifth aspect of the invention there is provided a method of operating a processor, the processor being switchable between a first execution mode and a second execution mode and having a first processor context when in the first execution mode and a second processor context, larger than the first processor context, when in the second execution mode, the method comprising executing a plurality of threads on a time share basis, and preserving only the first processor context when execution switches to a thread which is in the first execution mode, or when execution switches to a thread which was the last thread to be in the second execution mode.

According to a sixth aspect of the invention there is provided a method of operating a processor, the processor being switchable between a first execution mode and a second execution mode and having a first processor context when in the first execution mode and a second processor context, larger than the first processor context, when in the second execution mode, the method comprising executing a plurality of threads on a time share basis and limiting the number of threads that may be in the second execution mode at any one time to less than the total number of threads that may be active on the processor at any one time.

The invention also extends to corresponding operating systems for execution on a processor, and thus according to a seventh aspect of the invention there is provided an operating system for a processor which is switchable between a first execution mode and a second execution mode and which has a first processor context when in the first execution mode and a second processor context, different from the first processor context, when in the second execution mode, the operating system comprising an exception handling program portion for handling an exception generated when the processor attempts to change from one execution mode to the other.

According to an eighth aspect of the invention there is provided an operating system for a processor which is switchable between a first execution mode and a second execution mode and which has a first processor context when in the first execution mode and a second processor context, larger than the first processor context, when in the second execution mode, the operating system comprising a program portion for switching execution between a plurality of threads on a time share basis, and a program portion for preserving only the first processor context when execution switches to a thread which is in the first execution mode, or when execution switches to a thread which was the last thread to be in the second execution mode.

According to a ninth aspect of the invention there is provided an operating system for a processor which is switchable between a first execution mode and a second execution mode and which has a first processor context when in the first execution mode and a second processor context, larger than the first processor context, when in the second execution mode, the operating system comprising a program portion for switching execution between a plurality of threads on a time share basis, and a program portion for limiting the number of threads that may be in the second execution mode at any one time to less than the total number of threads that may be active on the processor at any one time.

The invention also provides computer programs and computer program products for carrying out any of the methods described herein, and computer readable media having stored thereon programs for carrying out any of the methods described herein.

Features of one aspect may be applied to any other aspect; features of the processor, method and operating system aspects may be applied to each other interchangeably.

Preferred features of the present invention will now be described, purely by way of example, with reference to the accompanying drawings.

DETAILED DESCRIPTION OF THE INVENTION

Figure 1:
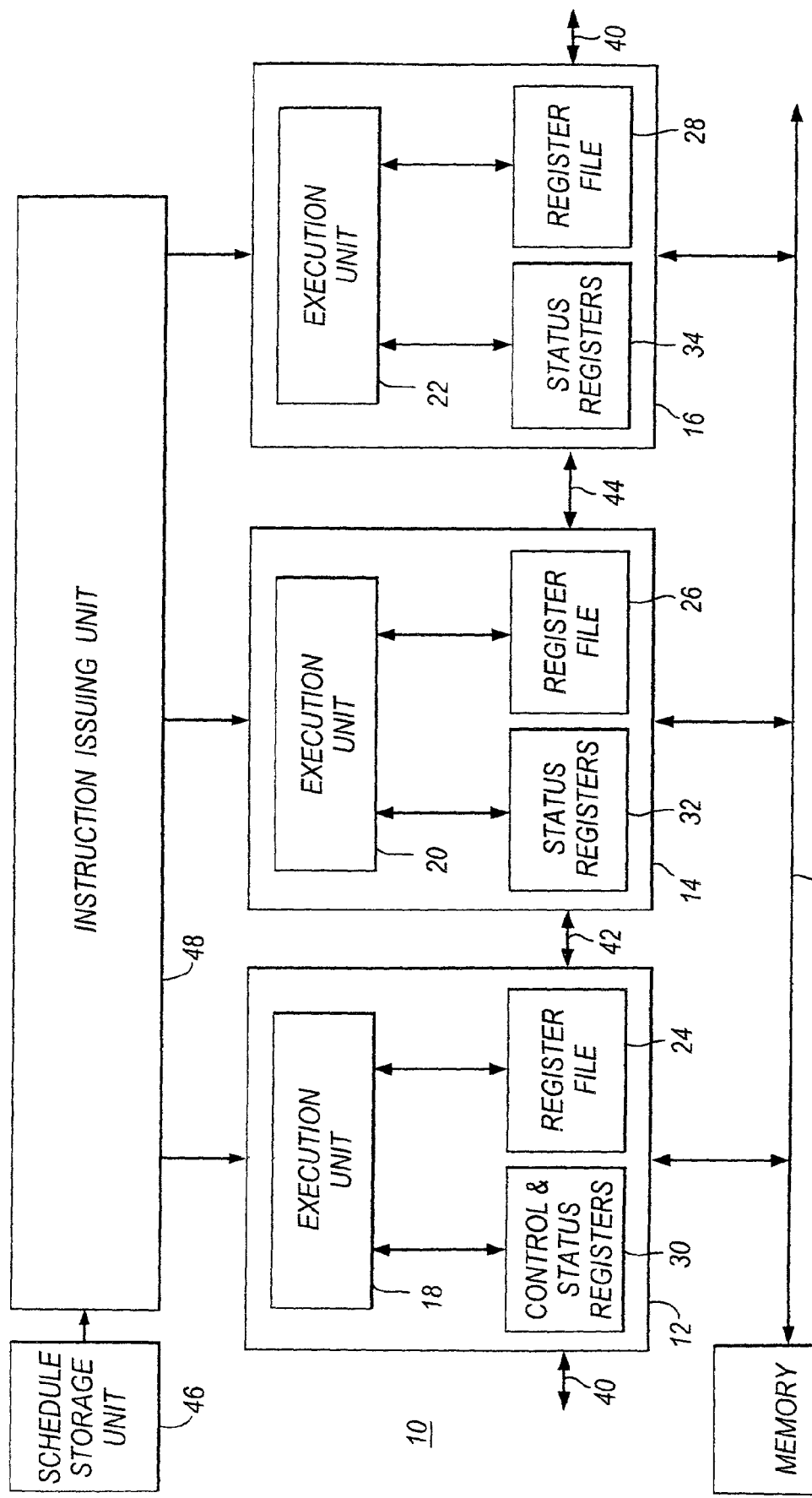
FIG. 1 is a block diagram of a processor embodying the present invention.

A processor embodying the present invention is shown in FIG. 1. Referring to FIG. 1, processor 10 comprises a plurality of computational units 12, 14, 16. Each computational unit comprises an execution unit 18, 20, 22 for executing instructions, a register file 24, 26, 28 containing registers for use when executing instructions, and a set of control and/or status registers 30, 32, 34. The computational units 12, 14, 16 are connected to external memory 36 (e.g. random access memory, RAM) via bus 38. The various computational units are connected via interfaces 40, 42, 44, which may be used, for example, to exchange values stored in the register files 24, 26, 28. The processor 10 also comprises a schedule storage unit 46 and an instruction issuing unit 48. In operation, instructions for execution are passed from the schedule storage unit 46 to the instruction issuing unit 48. The instruction issuing unit 48 issues the instructions to one or more of the computational units 12, 14, 16 in dependence on the type of instruction.

The processor 10 is designed to operate with two distinct instruction sets. The first instruction set, referred to herein as the scalar instruction set, is designed to be compact, and thus to be memory efficient. This instruction set resembles that of a conventional RISC (reduced instruction set computer) processor, and is suitable for general purpose applications. The scalar instruction set is executed in a mode of operation referred to as scalar mode. In this mode, the instruction issuing unit 48 issues instructions to the first computational unit 12 only, and the instructions are executed by that computational unit only. The first computational unit 12 is referred to herein as the master computational unit.

The second instruction set is a very long instruction word (VLIW) instruction set, which is designed for high computational throughput. This instruction set uses long instruction words, or instruction packets, which may be divided into smaller instructions for simultaneous execution. The VLIW instruction set is executed in a mode of operation referred to as VLIW mode. In this mode, instruction packets (VLIW packets) for execution are passed from the schedule storage unit 46 to the instruction issuing unit 48. The instruction issuing unit 48 divides the instruction packets into their constituent instructions, and issues the instructions of one packet to one or more of the master computational unit 12 and the other computational units 14, 16. The computational units 14, 16 are referred to herein as slave computational units. The computational units which have received the various instructions belonging to the packet then execute those instructions simultaneously.

Figure 2:
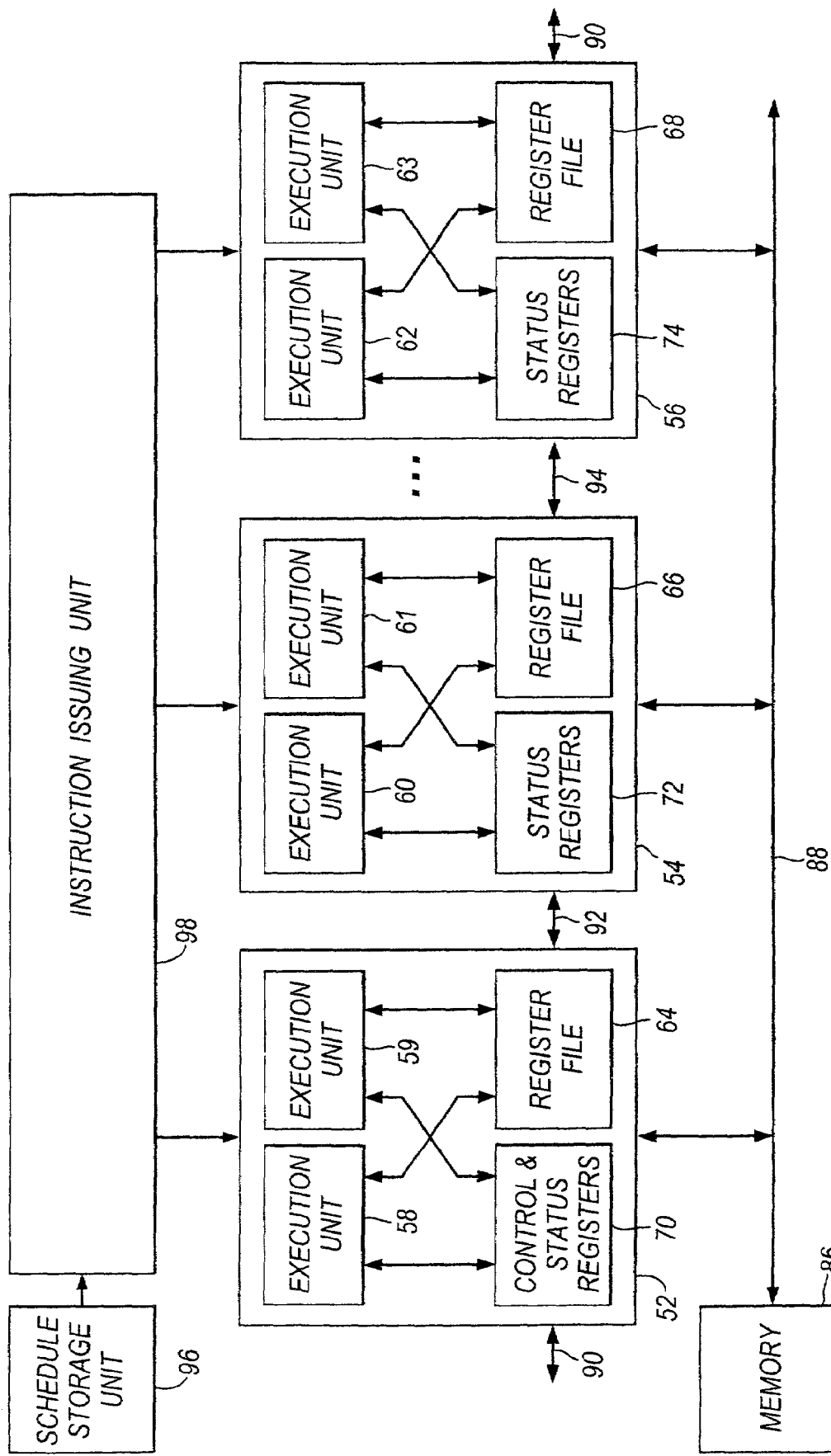
FIG. 2 is a block diagram of another processor embodying the present invention.

Another processor embodying the invention is shown in FIG. 2. The processor of FIG. 2 works in a similar way to that of FIG. 1, except that each computational unit comprises two execution units. As in the processor of FIG. 1, the number of computational units that are used to execute instructions at any one time depends on whether the processor is in scalar mode or VLIW mode. The arrangement shown in FIG. 2 is known as clustering, with each computational unit forming a cluster. In other embodiments, three or more execution units are provided per cluster.

Referring to FIG. 2, processor 50 comprises a plurality of computational units 52, 54, 56 each of which comprises two execution units 58, 59, 60, 61, 62, 63, as well as a register file 64, 66, 68 and a set of control and/or status registers 70, 72, 74. The computational units 52, 54, 56 are connected to external memory 86 (eg RAM memory) via bus 88. The various computational units are connected via interfaces 90, 92, 94. The processor 50 also comprises a schedule storage unit 96 and an instruction issuing unit 98.

In operation, instructions for execution are passed from the schedule storage unit 96 to the instruction issuing unit 98, which issues the instructions to one or more of the processing units 52, 54, 56. When the processor 50 is in scalar mode, instructions are issued to processing unit 52 only, whereas when the processor is in VLIW mode, instructions are issued to two or more processing units 52, 54, 56. In scalar mode, an instruction is processed either by execution unit 58 or by execution unit 59, for example in dependence on the type of instruction. In VLIW mode, parallel instructions may be processed at the same time by the two execution units within a processing unit.

The processors 10, 50 shown in FIGS. 1 and 2 are designed to support two different privilege modes, referred to as a user mode and a supervisor mode. The supervisor mode permits access to the entire processor state, that is, the entire processor memory, all registers etc. The user mode only permits restricted access to the processor state. For example, certain registers in the set of control and status registers 30, 70 in FIGS. 1 or 2 may be accessible only in supervisor mode. If the processor attempts an operation in user mode which is illegal for this mode of operation, an exception is generated. The exception causes a transition to the supervisor mode, and exception handling code (using part of an operating system) is then executed to handle the exception. Usually the operating system runs in supervisor mode and application code runs in user mode.

Figure 3:
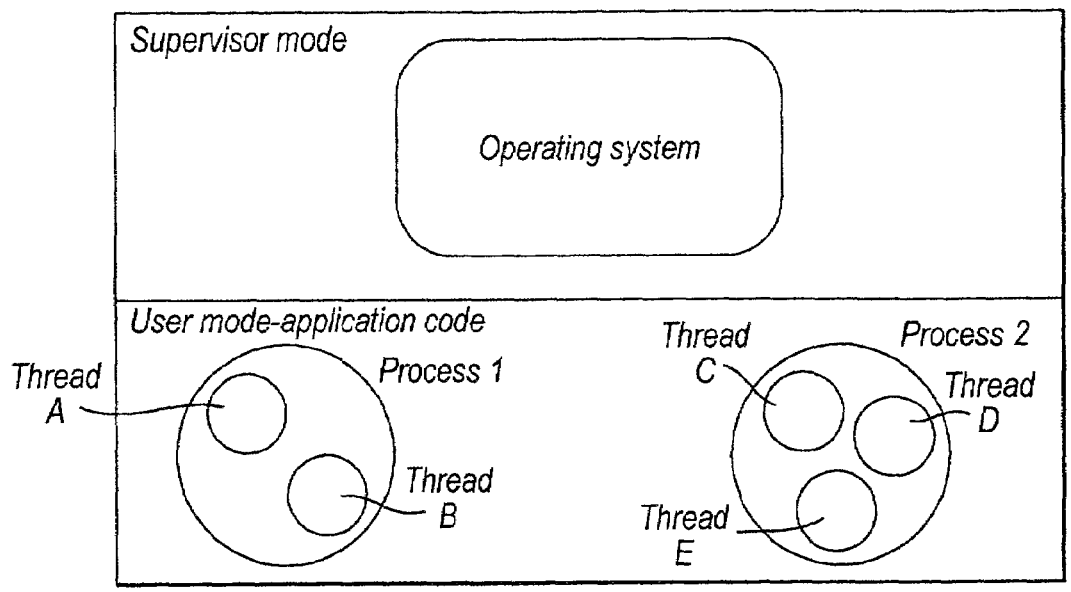
FIG. 3 illustrates the concept of various threads executing on a processor.

The user mode may execute several processes (programs) concurrently, each of which may have one or more threads (sub-programs). This situation is illustrated in FIG. 3. The various threads appear to operate in parallel, but in fact the operating system rapidly switches the processor's resources between the threads giving an illusion of concurrent operation. This is referred to as time sharing.

Various different time sharing techniques may be used to share the processor's resources between different threads. Typically, each thread in the system is given a priority. Groups of threads may have the same priority. In a simple multi-tasking technique, the operating system allows the current thread to execute until the thread itself relinquishes control either directly (i.e. the thread intentionally asks to be suspended) or indirectly, for example because the thread requests access to resources that are currently owned by another thread. When the thread relinquishes control, the operating system selects the highest priority thread that it is able to run and switches to that thread. If two or more threads have the highest priority then the operating system chooses one according to an internal rule.

In another time sharing technique, known as pre-emptive multitasking, the operating system may be running a thread when another higher priority thread becomes available to run. The operating system then suspends the current thread and switches to the higher priority thread. A higher priority thread may suddenly become able to run due to a number of circumstances. For example, the current thread may release resources which the higher priority thread is waiting for, or an interrupt may occur as a result of which the interrupt handling routine may "unblock" an operation on the higher priority thread. In an extension to this technique, known as time-slicing, the operating system regularly switches between different threads, each of which has the same (highest) priority.

The embodiments that will be described may be implemented with any of the time sharing techniques described above, or any other form of time sharing.

A switch from one thread of execution to another is referred to as a context switch. When a context switch occurs, it is necessary for the operating system to preserve the context of the outgoing thread, that is, the contents of the registers and other aspects of the processor state to which that thread has access. The context of the incoming thread must then be restored to that which it was when that thread was last processed. The operating system does not know which part of the context the outgoing thread was using or which part of the context the incoming thread requires to be restored, and so, conventionally, the entire context is preserved/restored. This situation is illustrated in FIG. 4.

Figure 4:
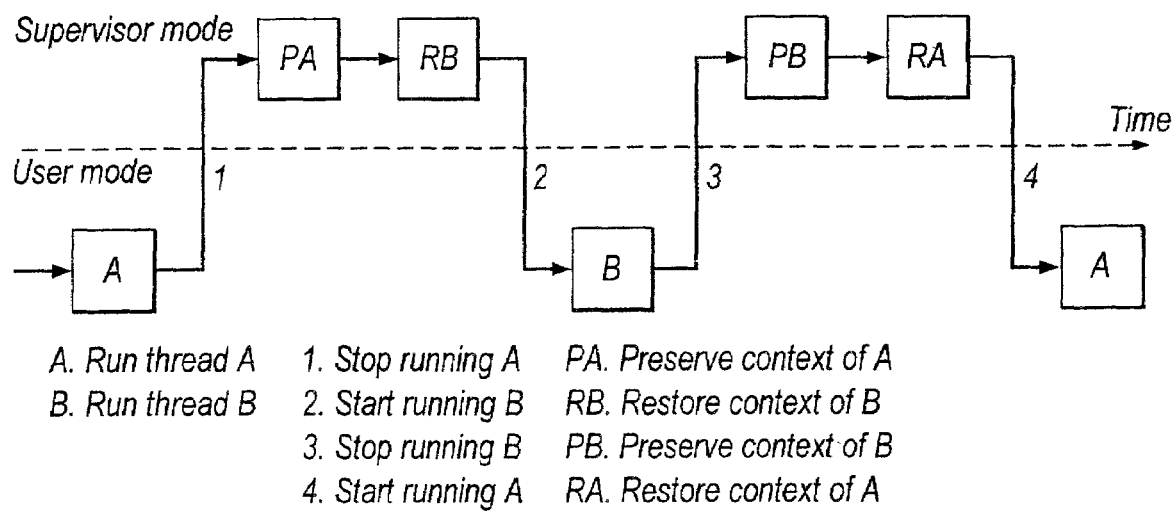
FIG. 4 illustrates the principle of context switches.

In FIG. 4 it is assumed that two threads, thread A and thread B, are executed on a time share basis. Initially the processor is executing thread A. At time t=1, a switch from thread A to thread B is initiated. The processor then stops running thread A and enters supervisor mode. In supervisor mode, the context of thread A is preserved by saving the contents of the various registers 24 to 34 in FIG. 1, or 64 to 74 in FIG. 2, to memory 36 or 86. Once the context of thread A has been preserved, the context of thread B is restored, by loading the various registers 24 to 34 or 64 to 74 with values which were previously stored in memory 36 or 86 when the processor last switched from thread B (or initial values if it is the first time that thread B has been executed). The processor then returns to user mode at time t=2 to execute thread B. At time t=3, a switch from thread B to thread A is initiated. The processor stops running thread B, enters supervisor mode, preserves the context of thread B, and restores the context of thread A. At time t=4 the processor returns to user mode to execute thread A.

As discussed above, the VLIW instruction set is designed for high computational throughput by providing instructions that may be processed in parallel. Instruction packets for execution are arranged such that the various constituent instructions will not conflict with each other when executed simultaneously. In situations where conflicts would arise (for example because one instruction required the result of another instruction to be available before it could be executed) then the conflicting instructions would be put into different instruction packets, and the instruction packets would be padded if necessary with no operation (NOP) instructions.

Certain processing tasks, such as the processing of high-speed multi-media streams of data, are particularly suited for processing using VLIW instruction sets, since different parts of the data stream may be processed independently. However, other processing tasks are less susceptible to parallel processing, and may result in highly-padded VLIW instruction packets, which increase the size of the code. Furthermore, when a processor is operating in VLIW mode it usually consumes more power, and thus scalar mode may be preferred in situations where low power consumption is desired. In addition, certain general purpose tasks may be prevented from being executed in VLIW mode. For these reasons, it may be desirable to run certain parts of a program in scalar mode, and certain parts in VLIW mode. The decision as to whether to use scalar mode or VLIW mode for a particular section of code is either made by the compiler at compile time, or else the programmer may explicitly state that one mode or the other is to be used.

In order to cause a transition from scalar mode to VLIW mode or vice versa, a particular instruction or other method is inserted at the appropriate point in the code. Such a method is referred to herein as a mode transition method (MTM), and the transition is referred to as a mode transition event (MTE). For example, to bring about a transition from scalar mode to VLIW mode, the processor may execute a special branch instruction, referred to herein as a bv (branch to VLIW mode) instruction, and to return from VLIW mode to scalar mode, the processor may execute another instruction, referred to herein as a rv (return from VLIW mode) instruction.

When the processor is operating in scalar mode, instructions are executed by the master computational unit 12 or 52 only, and thus the registers to which instructions have access in this mode are limited to those of the master processing unit. Furthermore, the number of registers in the register file which are directly addressable in scalar mode is normally a subset of the total number of registers in the register file, due to the compact nature of the instruction set. By contrast, in VLIW mode, instructions are executed in a plurality of computational units, and the VLIW instructions can normally directly address all registers in the register files. As a consequence, the VLIW context is considerably larger than the scalar context.

For example, the scalar instruction set may be designed to address a maximum of 16 registers, in which case the context that needs to be saved in scalar mode (referred to as the scalar context) consists of those 16 registers plus other processor state such as the control and status registers 30, 70. In VLIW mode the instruction set may be designed to address 32 registers, and there may be up to 32 computational units each executing one or more instructions simultaneously. In this case, the context that needs to be saved in VLIW mode (referred to as the VLIW context) consists of a potential total of 1024 registers plus the other aspects of the processor state such as the control and status registers 30, 70 and status registers 32, 34, 72, 74.

If VLIW context switches occur rapidly, preserving and restoring the VLIW context can consume a significant amount of processor time, thereby reducing the effective processor performance.

In preferred embodiments of the invention, mode transition methods which cause a transition from scalar mode to VLIW mode are not allowed to be executed in user mode, so that if any thread attempts to execute such a mode transition method in user mode, an exception is generated. Such an exception causes the processor to make a transition into supervisor mode and the operating system then handles the exception. This mechanism allows the operating system to manage context switches in two different ways. Firstly, it allows the operating system to preserve and restore the VLIW context only when strictly necessary, rather than on every context switch. This is done by preserving the VLIW context of one thread only when VLIW mode is next entered by another thread. Secondly it allows the operating system to monitor and/or to control which threads operate in VLIW mode.

Figure 5:
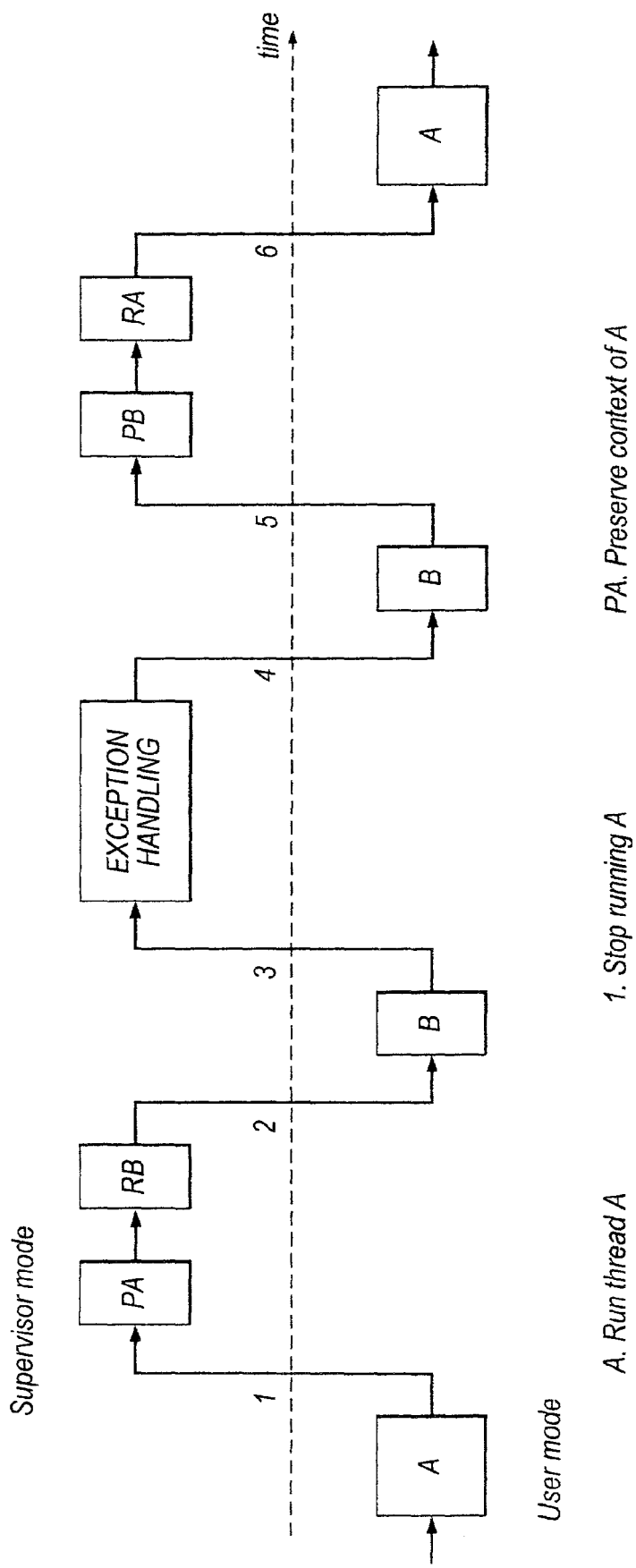
FIG. 5 illustrates the concept of making mode transition methods only visible in supervisor mode, in accordance with embodiments of the present invention.

The concept of making mode transition methods only visible in supervisor mode is illustrated in FIG. 5. In FIG. 5, two threads A and B, which correspond to threads A and B in FIG. 4, are executed on a time-share basis by the processor. It is assumed that thread B contains a mode transition method. Initially the processor is executing thread A. At time t=1, a switch from thread A to thread B is initiated. The processor then stops running thread A and enters supervisor mode. In supervisor mode, some or all of the context of thread A is preserved and some or all of the context of thread B is restored. The processor then returns to user mode at time t=2 to execute thread B. At time t=3 a mode transition method is encountered in thread B. Since mode transition methods are not allowed in user mode, an exception is generated and the processor enters supervisor mode. In the supervisor mode an exception handling routine is executed to deal with the exception. At time t=4 the processor re-enters user mode and continues to execute thread B, but now in the other mode. At time t=5, a switch from thread B to thread A is initiated. The processor stops running thread B, enters supervisor mode, preserves some or all of the context of thread B, and restores some or all of the context of thread A. At time t=6 the processor returns to user mode to execute thread A.

First Embodiment

In a first embodiment, all threads which run on the processor are able to enter VLIW mode. When a thread attempts to enter VLIW mode (by means of a mode transition method) an exception is generated, and the exception is handled by the operating system. As part of the exception handling, the VLIW context of the last thread to use VLIW mode is preserved, if necessary.

Figure 6:
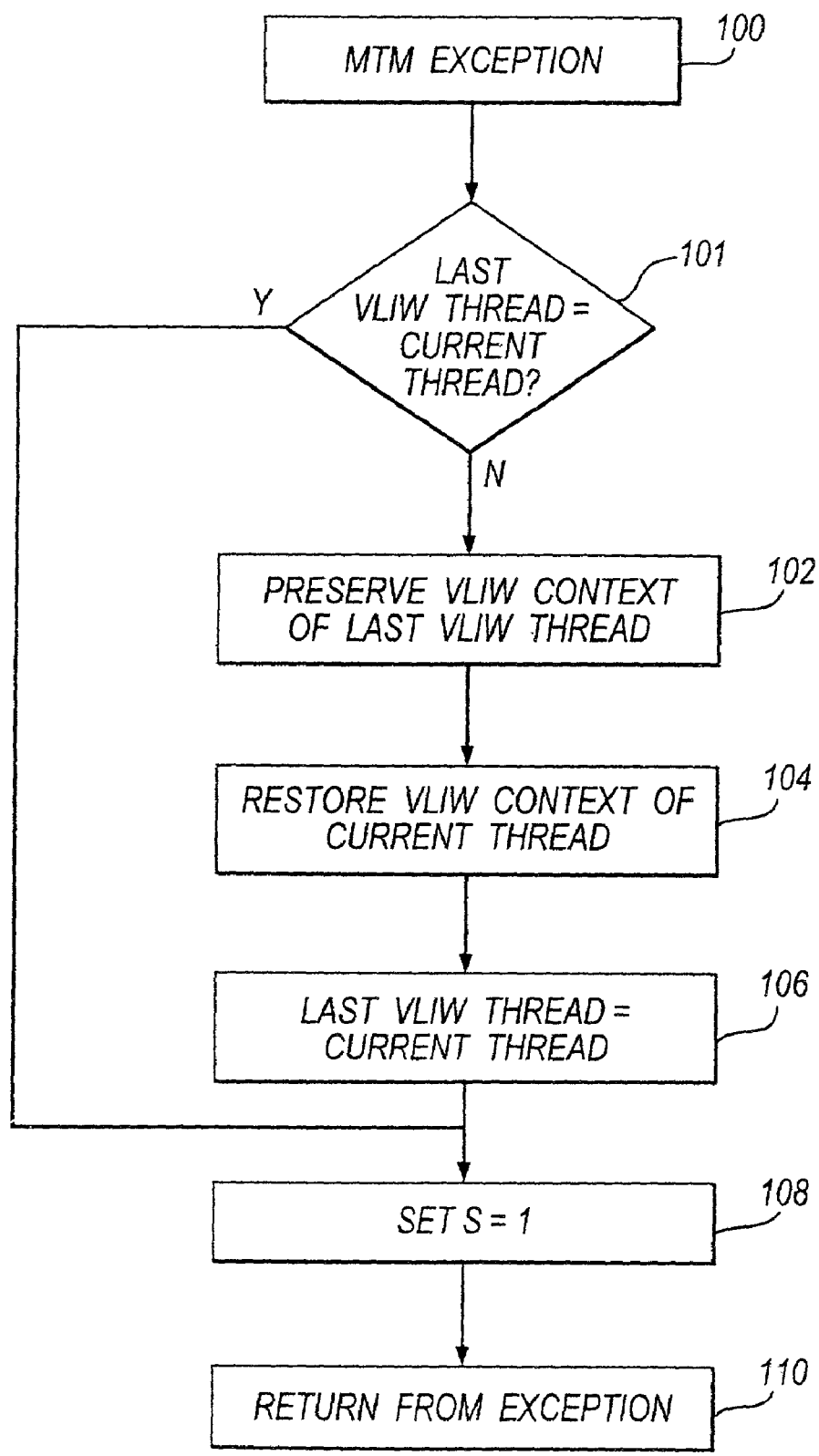
FIG. 6 shows steps taken by an exception handling routine in a first embodiment of the invention.
Figure 7:
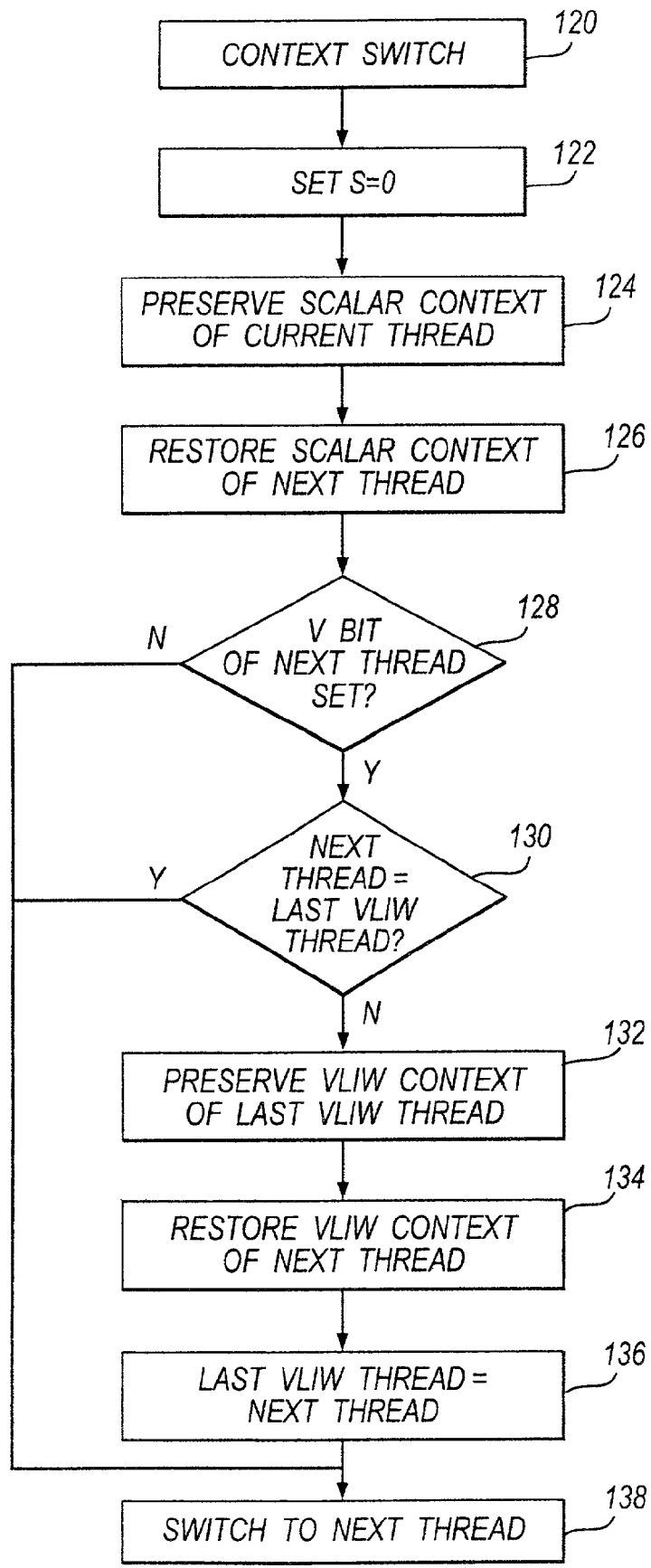
FIG. 7 shows steps taken by an operating system in the first embodiment when a context switch occurs.

Operation of the first embodiment will now be described with reference to FIGS. 6 and 7. FIG. 6 shows the steps taken by the exception handling routine when an exception is generated by a thread attempting to enter VLIW mode, and FIG. 7 shows the steps taken by the operating system when a context switch occurs. In this embodiment, a transition from VLIW mode to scalar mode may or may not cause an exception to be generated, depending on the chosen implementation.

Referring to FIG. 6, in step 100 an exception is generated by a thread which is in user mode attempting to execute a mode transition method that would cause a transition from scalar mode to VLIW mode. This exception causes the processor to enter supervisor mode. In step 101 it is determined whether the thread which generated that exception is also the last thread to have been in VLIW mode. This is done by referring to a record of the last thread to be in VLIW mode which is kept by the operating system. If the current thread is also the last thread to have been in VLIW mode then there is no need to restore the VLIW context of the current thread, and thus there is no need to preserve the current VLIW context.

If the current thread is not the last thread to have been in VLIW mode, then in step 102 the current VLIW context of the processor is preserved by saving the contents of the registers to memory. The current VLIW context is saved as the VLIW context of the last thread to have been in VLIW mode. This is done by referring to the record of the last thread to have been in VLIW mode, and associating the saved VLIW context with that thread. In step 104 the VLIW context of the current thread is restored, by retrieving the contents of the registers associated with that thread from memory. In step 106 the processor updates its record of which thread was the last thread to be in VLIW mode to indicate that the current thread is the last thread to be in VLIW mode.

In step 108 a mode bit S is set. The mode bit S is a bit in one of the control and status registers 30, 70 of the master computational unit 12, 52 in FIGS. 1 or 2, and is only accessible in supervisor mode. When this mode bit is set, a mode transition method is permitted to be executed in user mode without an exception being generated. In step 110 the processor returns from the exception to the point in the executing thread at which it left off. Since the mode bit is now set, the MTM which originally caused the exception can now be executed without causing an exception.

In practice, since the VLIW context is largely a superset of the scalar context, in steps 102 and 104 only that part of the VLIW context which is different from the scalar context need be preserved and restored.

Referring to FIG. 7, in step 120 a context switch is initiated by the operating system in order to switch the processor's resources from one thread to another. In step 122 the mode bit S is reset. This is to ensure that if the next thread attempts to enter VLIW mode then an exception will be generated. In step 124 the scalar context of the current thread is preserved, and in step 126 the scalar context of the next thread is restored. In step 128 it is determined whether or not the next thread is in VLIW mode. This is done by consulting a bit, called the V bit, which is a bit in one of the control and status registers 30, 70 of the master computational unit 12, 52 in FIGS. 1 or 2. The V bit is part of the scalar context of the next thread which is restored in step 126. If this bit is set, then the next thread is in VLIW mode, and if it is reset then the next thread is in scalar mode. If the next thread is in scalar mode then it is not necessary to restore the VLIW context of the thread, and so the processor then switches to the next thread in step 138 with only the scalar context of that thread having been restored.

If in step 128 it is determined that the next thread is in VLIW mode, then in step 130 it is determined whether the next thread was the last thread to have been in VLIW mode. This is done by referring to the record of the last thread to be in VLIW mode which is kept by the operating system. If the next thread is also the last thread to have been in VLIW mode, then the current processor VLIW context is also the VLIW context of the next thread, and so the VLIW context of the next thread does not need to be restored. In this case, the processor switches to the next thread in step 138 with only the scalar context of that thread having been restored. If however the next thread was not the last thread to be in VLIW mode, then it is necessary to restore the VLIW context of the next thread. In this case, in step 132 the current processor VLIW context (or that part of the VLIW context which is different from the scalar context) is preserved and associated with the last thread to be in VLIW mode; in step 136 the VLIW context (or that part of the VLIW context which is different from the scalar context) of the next thread is restored; and in step 136 the processor updates its record of the last thread to be in VLIW mode by recording that the next thread is in VLIW mode. Then in step 138 the processor switches to the next thread.

In FIGS. 6 and 7 it is assumed that a mode bit S is toggled to allow the processor to make a transition into VLIW mode on returning from an exception caused by a MTM. Alternatively, the exception handler itself could cause the processor to transition into VLIW mode, and return to the point in the executing thread just after the MTM. Other suitable techniques for preventing the exception from being repeatedly generated and causing the transition may also be used.

It will be noted from the above description that the VLIW context of the processor is only preserved when two conditions are met: firstly that the next thread is in VLIW mode, and secondly that the next thread is not the last thread to have been in VLIW mode. In this way the processor's VLIW context is only saved when strictly necessary, rather than on every context switch.

Figure 8:
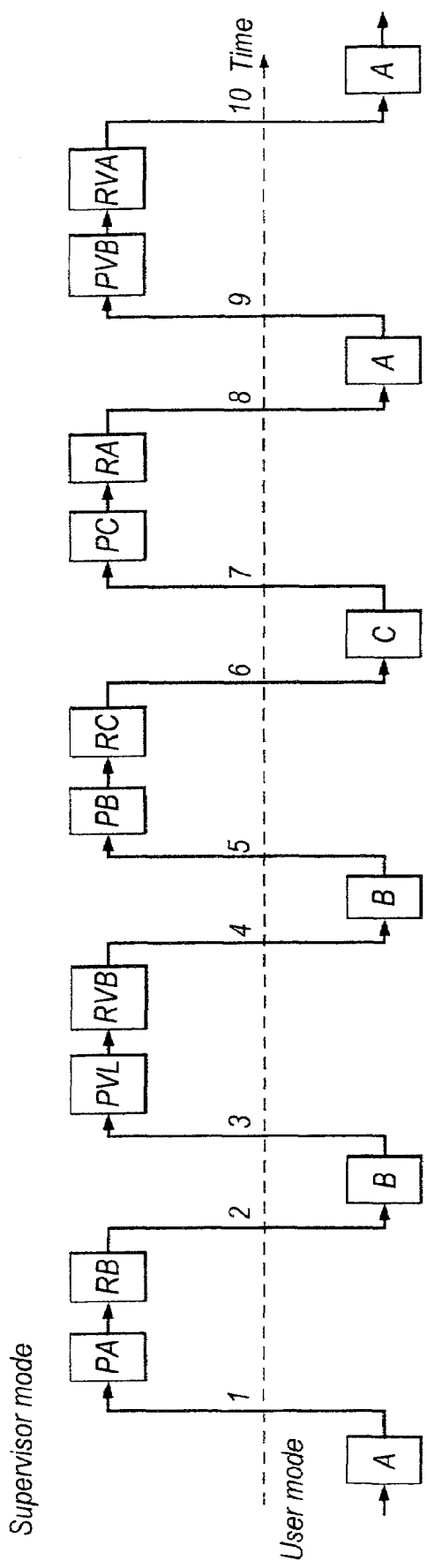
FIG. 8 shows an example of the operation of the first embodiment.

An example of the operation of the first embodiment is shown in FIG. 8. In FIG. 8 all threads are initially in scalar mode. The processor is initially executing thread A. At time t=1 the processor stops running thread A and enters supervisor mode. In supervisor mode the scalar context of thread A is preserved and the scalar context of thread B is restored. The processor then returns to user mode at time t=2 to execute thread B in scalar mode. At time t=3, a branch-to- VLIW-mode instruction is encountered in thread B, and as a consequence the processor enters supervisor mode. In the supervisor mode, the VLIW context of the last thread to use VLIW mode is preserved, and the VLIW context of thread B is restored. At time t=4 the processor re-enters user mode and continues to execute thread B, but now in VLIW mode. At time t=5, the processor stops running thread B, enters supervisor mode, preserves the scalar context of thread B, and restores the scalar context of thread C. At time t=6 the processor returns to user mode to execute thread C in scalar mode. At time t=7, the processor stops running thread C, enters supervisor mode, preserves the scalar context of thread C, and restores the scalar context of thread A. At time t=8 the processor returns to user mode to execute thread A. At time t=9, a branch-to-VLIW-mode instruction is encountered in thread A, which causes the processor to enter supervisor mode. At this point, the VLIW context of thread B is preserved and the VLIW context of thread A is restored. At time t=10 the processor re-enters user mode and continues to execute thread A, but now in VLIW mode.

In the example shown in FIG. 8, the VLIW context of thread B is only preserved at the point at which thread A enters VLIW mode. If, however, no mode transition method had occurred in thread A, then when the processor switched back to thread B the processor's VLIW context would still be that of thread B, since no other thread would have altered this context. Thus in this case there would have been no need to preserve or restore the VLIW context of thread B, and thus the time which would otherwise have been spent in preserving and restoring the VLIW context would have been saved.

Second Embodiment

In a second embodiment of the invention, only certain threads are allowed access to VLIW mode, and all other threads are barred from entering VLIW mode. In one example, only one thread is ever allowed access to VLIW mode. This may be either a thread in supervisor mode, or a thread in user mode. In another example a certain number of specified threads are allowed access to VLIW mode. By limiting the number of threads which are allowed access to VLIW mode, the number of VLIW context switches that must be made can be limited, or the need to make VLIW context switches can be eliminated.

Figure 9:
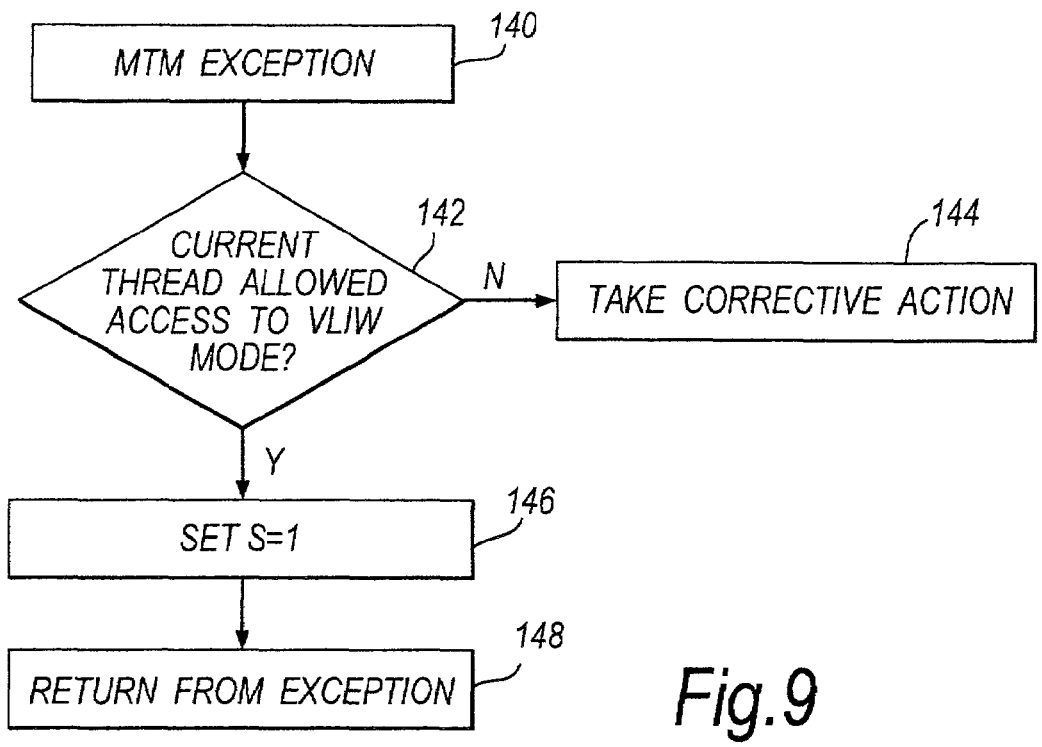
FIG. 9 shows the steps taken by an exception handling routine in a second embodiment of the invention.
Figure 10:
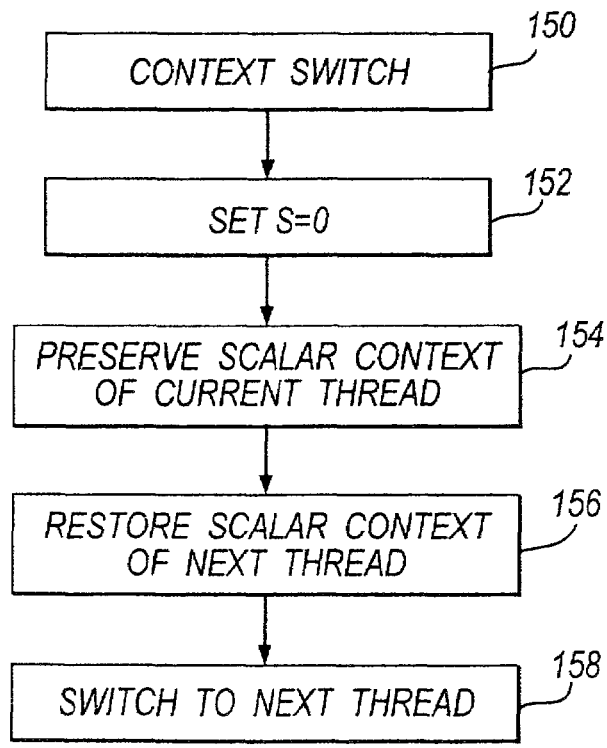
FIG. 10 shows steps taken by an operating system in the second embodiment when a context switch occurs.

Operation of the second embodiment will now be described with reference to FIGS. 9 and 10. FIG. 9 shows the steps taken by the exception handling routine when an exception is generated by a thread attempting to enter VLIW mode, and FIG. 10 shows the steps taken by the operating system when a context switch occurs. In FIGS. 9 and 10 it is assumed that only one predetermined thread is ever allowed access to VLIW mode. In this embodiment, a transition from VLIW mode to scalar mode may or may not cause an exception to be generated, depending on the chosen implementation.

Referring to FIG. 9, in step 140 an exception is generated by a thread attempting to process a mode transition method in user mode. This exception causes the processor to enter supervisor mode. In step 142 it is determined whether that thread is allowed access to VLIW mode. In this example, only one thread is ever allowed access to VLIW mode, and so if the thread that caused the exception is not that thread, then in step 144 the appropriate corrective action is taken. This action may include terminating the thread that caused the exception, or continuing the thread in scalar mode if possible.

If the thread that caused the exception is allowed to enter VLIW mode, then in step 146 the mode bit S is set, and in step 148 the processor returns from the exception to the point in the thread at which it left off. Since the mode bit S is set, the mode transition method which caused the exception can be executed without causing an exception. The thread thus makes the transition into VLIW mode and continues executing in that mode.

Referring to FIG. 10, in step 150 a context switch is initiated by the operating system in order to switch the processor's resources from one thread to another. In step 152 the mode bit S is reset. This is to ensure that if the next thread attempts to enter VLIW mode then an exception will be generated. In step 154 the scalar context of the current thread is preserved, and in step 156 the scalar context of the next thread is restored. In step 158 the processor switches to the next thread.

In FIGS. 9 and 10 it is assumed that only one thread is ever allowed access to VLIW mode, and thus the VLIW context never needs to be saved. In other implementations, certain other threads may also be allowed access to VLIW mode, and thus steps are taken to save the VLIW context when necessary, in a similar way to that shown in FIGS. 6 and 7. In this case, although it may sometimes be necessary to preserve the VLIW context, the number of times that this is necessary is reduced because the number of threads which may be in VLIW mode is limited.

Third Embodiment

In a third embodiment of the invention the operating system only allows one thread (or a certain number of threads) to operate in VLIW mode at any one time. This technique can be viewed as a "token passing" technique, in which a token can be passed from thread to thread, but only the thread which has the token can enter VLIW mode. This technique can reduce the number of times that the processor's VLIW context must be preserved and restored.

Figure 11:
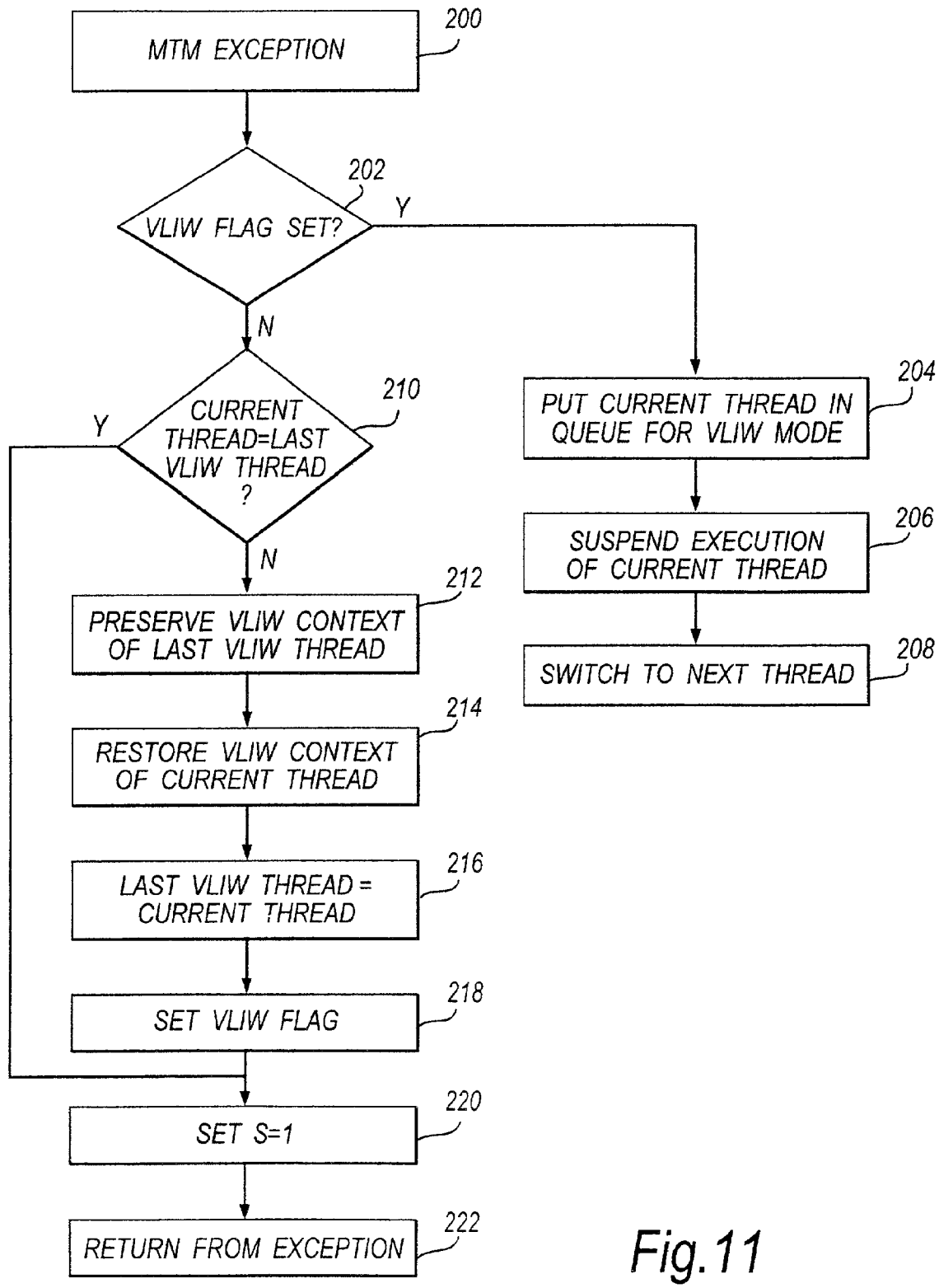
FIG. 11 shows the steps taken by an exception handling routine in a third embodiment of the invention.
Figure 12:
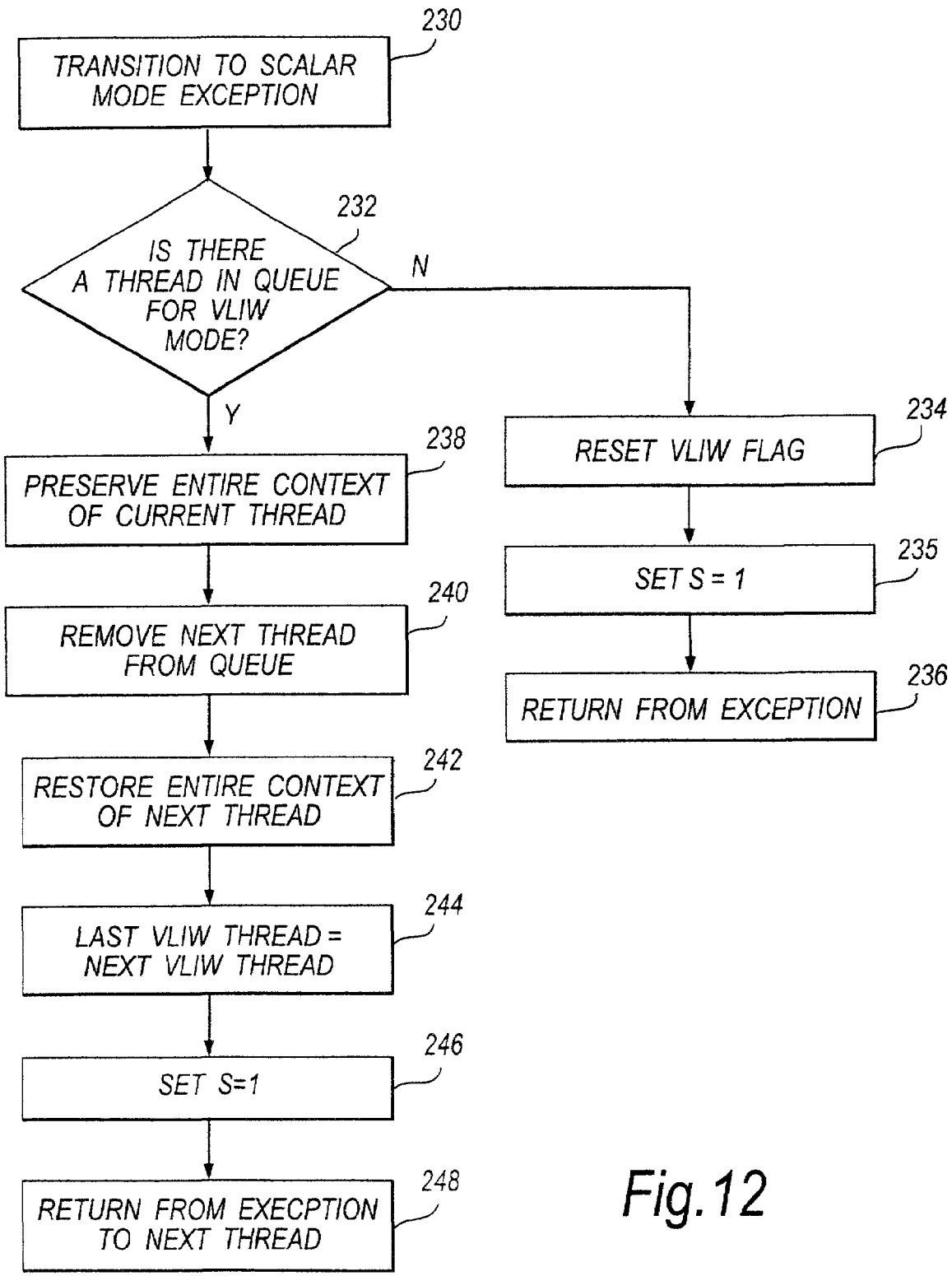
FIG. 12 shows the steps taken by an operating system in the third embodiment when an exception is generated by a thread returning to scalar mode from VLIW mode.

Operation of the third embodiment will now be described with reference to FIGS. 11 and 12. FIG. 11 shows the steps taken by the exception handling routine when an exception is generated by a thread attempting to enter VLIW mode, and FIG. 12 shows the steps taken by the operating system when an exception is generated by a thread returning to scalar mode from VLIW mode. In this embodiment, the steps taken when a context switch occurs are the same as those shown in FIG. 10.

Referring to FIG. 11, in step 200 an exception is generated by an executing thread attempting to process a MTM in user mode. This exception causes the processor to enter supervisor mode. In step 202 it is determined whether there is another thread which is in VLIW mode. This is done by consulting a flag (referred to as the VLIW flag) in the control and status registers 30, 70 of the master computational unit 12, 52 in FIGS. 1 or 2. If there is another thread in VLIW mode, then the current thread is prevented from entering VLIW mode until the thread which is in VLIW mode has reverted back to scalar mode. In step 204 the current thread is put in a queue for VLIW mode; in step 206 execution of the current thread is suspended; and in step 208 the operating system switches to the next thread, rather than returning to the current thread. In other implementations, instead of suspending operation of the current thread, the current thread continues in scalar mode if possible, or the current thread is terminated.

If in step 202 it is determined that there is no other thread in VLIW mode, then in step 210 it is determined whether the current thread is also the last thread to have been in VLIW mode. This is done by referring to a record of the last thread to be in VLIW mode which is kept by the operating system. If the current thread is also the last thread to have been in VLIW mode then there is no need to preserve and restore the VLIW context. If the current thread is not the last thread to have been in VLIW mode, then in step 212 the current VLIW context of the processor (or that part of the VLIW context which is different from the scalar context) is preserved, and this context is associated with the VLIW context of the last thread to be in VLIW mode. In step 214 the VLIW context of the current thread (or that part of the VLIW context which is different from the scalar context) is restored. In step 216, the processor updates its record of which thread was the last thread to be in VLIW mode to indicate that the current thread is the last thread to be in VLIW mode. In step 218 the VLIW mode flag is set, indicating that there is a thread in VLIW mode. In step 220 the mode bit S is set, and in step 222 the processor returns from the exception to the point in the executing thread at which it left off. Since the mode bit is set, the MTM which originally caused the exception can now be executed without causing an exception.

In the third embodiment, a transition from VLIW mode to scalar mode also causes an exception to be generated. In this way, the operating system can determine when one thread has stopped execution in VLIW mode, and thus give permission to another thread to enter VLIW mode. The steps taken when such an exception is generated are shown in FIG. 12.

Referring to FIG. 12, in step 230 an exception is generated by an executing thread attempting to execute a return-from-VLIW-mode instruction in user mode. In step 232 it is determined whether there is a thread in the queue for VLIW mode. If there is no thread in the queue, then in step 234 the VLIW flag is reset, indicating that no thread is in VLIW mode. In step 235 the mode bit S is set to allow the return-from-VLIW-mode instruction to be executed in user mode, and in step 236 the processor returns from the exception to the point in the thread at which it left off.

If in step 232 it is determined that there is a thread in the queue for VLIW mode, then in step 238 the entire context (that is, both the scalar context and the VLIW context) of the current thread is preserved. In step 240 the next thread in the queue for VLIW mode is removed from the queue, and in step 242 the entire context of that thread is restored. In step 244 the record of the last thread to be in VLIW mode is updated to indicate the next thread. In step 246 the mode bit S is set, and in step 248 the processor returns to the point in the next thread at which it left off when that thread attempted to enter VLIW mode.

As an alternative to using the mode bit S to enable and disable the return-from-VLIW-mode instruction, a separate mode bit R could be provided for this purpose. In such a case, in step 235 the mode bit R would be set and the mode bit S would be reset. Both mode bits would be reset on context switches.

In the third embodiment, the steps taken when a context switch occurs are the same as those shown in FIG. 10. Since only one thread at a time is allowed access to VLIW mode, it is not necessary to save the VLIW context when context switches occur. In an alternative implementation, a predetermined number of threads are allowed to enter VLIW mode at any one time. In this implementation, the VLIW context may need to be saved on context switches. This can be done in the way shown in FIG. 7.

In a variant of the third embodiment, context switches are banned while one thread (or another predetermined number) is in VLIW mode. In this variant, the operating system prevents context switches from taking place while the VLIW flag is set, and thus the only time that the VLIW context may need to be preserved is when a thread first enters VLIW mode. The steps taken when an exception is generated by a thread attempting to enter VLIW mode are the same as those shown in FIG. 6.

Although the above description relates, by way of example, to a processor having a scalar mode and a VLIW mode of operation, the present invention is applicable to any processor having two or more modes of operation, where one mode has a different context from the other mode, and in particular where one mode has a substantial context and the other mode has a limited context. Either or both modes may be a scalar mode or a parallel mode. The parallel mode or modes need not be based on VLIW, but may be any mode in which two or more instructions are processed substantially in parallel, for example by using some form of instruction level parallelism.

A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

It will be understood that the present invention has been described above purely by way of example, and modifications of detail can be made within the scope of the invention.

The invention claimed is:

1. A processor switchable between a first execution mode and a second execution mode, the processor having a first processor context when in the first execution mode and a second processor context, larger than the first processor context, when in the second execution mode, wherein the processor is arranged to execute a plurality of threads on a time share basis, the threads being able to change execution mode, and wherein the processor is arranged to generate an exception when the processor attempts to change from one execution mode to the other to keep track of when the execution modes are used and control which processor contexts are preserved at which times;

the number of threads in the second execution mode at any one time being limited, to limit the number of times that the second processor context is preserved and restored;

the number of threads that may be in the second execution mode at any one time being less than the total number of threads that may be active on the processor at any one time;

the processor being arranged such that, when said exception has been generated, a check is carried out to determine whether the thread that caused the exception is allowed to enter the second execution mode;

the check determining whether a predetermined number of other threads are already in the second execution mode;

wherein the processor is arranged such that, if a predetermined number of other threads are already in the second execution mode, execution of the thread that caused the exception is suspended until the number of other threads that are in the second execution mode is less than the predetermined number.

2. A processor according to claim 1, wherein the processor is arranged to preserve the second processor context, or that part of the second processor context which is different from the first processor context, when said exception has been generated.

3. A processor according to claim 1, wherein the processor is arranged such that, when the processor is switched to a thread which is in the first execution mode, or when the processor is switched to a thread which was the last thread to be in the second execution mode, only the first processor context is preserved.

4. A processor according to claim 3, wherein the second processor context, or that part of the second processor context which is different from the first processor context, is preserved when the processor next enters the second execution mode to execute a thread other than a last thread to be in the second execution mode.

5. A processor according to claim 3, wherein the first execution mode is a scalar mode and the second execution mode is a parallel mode.

6. A processor according to claim 1, wherein the number of threads that may be in the second execution mode at any one time is less than the total number of threads that may be active on the processor at any one time.

7. A processor according to claim 6, wherein the processor is arranged such that, when said exception has been generated, a check is carried out to determine whether the thread that caused the exception is allowed to enter the second execution mode.

8. A processor according to claim 7, wherein the check comprises determining whether that thread is a thread which is barred from the second execution mode.

9. A processor according to claim 7, wherein the check comprises determining whether a predetermined number of other threads are already in the second execution mode.

10. A processor according to claim 1, wherein the processor is arranged to execute a first instruction set when in the first execution mode and a second instruction set when in the second execution mode.

11. A processor according to claim 1, wherein the processor is switchable between a supervisor mode and a user mode, the user mode having restricted access to the processor's resources in comparison to the supervisor mode, and, when said exception is generated, the processor transfers from the user mode to the supervisor mode.

12. A processor according to claim 1, the processor comprising at least one execution unit and a plurality of storage locations, the first processor context comprising the contents of storage locations accessible in the first execution mode and the second processor context comprising the contents of storage locations accessible in the second execution mode.

13. A processor according to claim 1, the processor comprising a plurality of computational units for executing instructions in parallel, each computational unit having at least one execution unit and at least one storage location to which the execution unit has access.

14. A processor according to claim 1, wherein the first execution mode is a scalar mode and the second execution mode is a parallel mode.

15. A method of operating a processor, the processor being switchable between a first execution mode and a second execution mode and having a first processor context when in the first execution mode and a second processor context, larger than the first processor context, when in the second execution mode, the method comprising executing a plurality of threads on a time share basis, the threads being able to change execution mode, and generating an exception when the processor attempts to change from one execution mode to the other to limit the number of threads that may be in the second execution mode at any one time, thereby limiting the number of times that the second processor context is preserved and restored, wherein the processor is arranged such that, if a predetermined number of other threads are already in the second execution mode, execution of the thread that caused the exception is suspended until the number of other threads that are in the second execution mode is less than the predetermined number.

16. A computer readable storage medium having stored thereon on operating system for a processor which is switchable between a first execution mode and a second execution mode and which has a first processor context when in the first execution mode and a second processor context, larger than the first processor context, when in the second execution mode, the operating system comprising a first program portion for switching execution between a plurality of threads on a time share basis, a second program portion allowing the threads to change execution mode, and exception handling program portion for handling an exception generated when the processor attempts to change from one execution mode to the other, and a third program portion for limiting the number of threads that may be in the second execution mode at any one time, wherein the processor is arranged such that, if a predetermined number of other threads are already in the second execution mode, execution of the thread that caused the exception is suspended until the number of other threads that are in the second execution mode is less than the predetermined number.

* * * * *